United States Patent [19]

Hirota et al.

[11] Patent Number: 4,791,554

[45] Date of Patent: Dec. 13, 1988

[54] METHOD AND APPARATUS FOR PREVENTING DEADLOCK IN A DATA BASE MANAGEMENT SYSTEM

[75] Inventors: Atsuhiko Hirota; Takashi Owaki, both of Hitachi; Yasutaka Yamaguchi, Yokohama; Toshihiro Hayashi, Hitachi, all of Japan

[73] Assignee: Hitachi, Ltd., Tokyo, Japan

[21] Appl. No.: 848,484

[22] Filed: Apr. 7, 1986

[30] Foreign Application Priority Data

Apr. 8, 1985 [JP] Japan ................................. 60-73817

[51] Int. Cl.⁴ .............................................. G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,189,771 | 2/1980 | Roeuer | 364/200 |
| 4,224,664 | 9/1983 | Trinchieri | 364/200 |
| 4,318,182 | 3/1982 | Bachman et al. | 364/200 |
| 4,403,285 | 9/1983 | Kikuchi | 364/200 |
| 4,627,019 | 12/1986 | Ng | 364/900 |

OTHER PUBLICATIONS

J. W. Havender, "Avoiding Deadlock In Multitasking Systems", 1968.

*Primary Examiner*—Gareth D. Shaw
*Assistant Examiner*—Kevin A. Kriess
*Attorney, Agent, or Firm*—Antonelli, Terry & Wands

[57] ABSTRACT

In a computer system for parallelly executing a plurality of tasks by sharing a plurality of resources in a data base of a computer, a use sequence of the resources to be used by each task is inputted to the computer prior to the execution of the tasks. A possibility of deadlock due to sharing of common resources amojng the tasks is checked based on the information on the use sequence, and a deadlock avoidance information table is prepared. When the task issues a start request, the deadlock avoidance information table is referred and the start of the task which has the possibility of the deadlock is delayed.

14 Claims, 6 Drawing Sheets

METHOD AND APPARATUS FOR PREVENTING DEADLOCK IN A DATA BASE MANAGEMENT SYSTEM

BACKGROUND OF THE INVENTION

The present invention relates to method and apparatus for controlling a data base in which resources are shared by parallelly executed tasks, and more particularly to a method and apparatus for exclusively controlling a data base which assures integrity of data included in the resources and which is suitable to a data base management system which requires a high response for data handling.

If data included in resources which are shared by tasks, such as a data base in a computer system are simultaneously updated or referenced by a plurality of parallelly executed tasks, the data may be destroyed (destruction of data integrity) or an error may be included in processing results of the tasks.

In a prior art data base managment system, a mechanism (exclusive control mechanism) is provided to prevent a plurality of tasks from simultaneously handling the data base or a resource which is a portion of the data base.

In a conventional exclusive control system, the data base or a portion thereof (resource) is locked only for a period necessary for one task and the handling of the locked resource by other tasks is delayed until the resource is unlocked. (Locking system).

However, where a plurality of resources are used and if each task sequentially locks the resources as required without unlocking the resources, one task may attempt to lock the resource locked by other task and waits for unlocking of the task (deadlock). In this case, both tasks may not be executed.

Thus, in the data base management system which effects the exclusive control by the locking method, the exclusive control mechanism is provided with means for preventing the deadlock.

In the prior art method for preventing the deadlock, the occurrence of the deadlock is detected and a normal state is restored (back-out system), or locking of resources which one task uses are collectively controlled to prevent the deadlock (bundle locking system).

In the bundle locking system, all resources which the task may need in a series of processings are collectively locked, and the locked resource does not request locking to other resources. In this system, the deadlock is prevented because resource wait status in which the task waits for unlocking of the resource locked by another task does not occur.

In the bundle locking system, however, when a task which uses a plurality of resources is started, all resources related to the task are locked even if only one of the resources is accessed. As a result, the lock period of the resources is long and the parallel processing ability of the tasks (i.e., the number of tasks which can be executed in parallel) is lowered. That is, even when one task accesses only a portion of the collectively locked resources, the other tasks cannot access the nonaccessed resources of the collectively locked resources. Further, the resources which are not certain whether they are required or not until the task is executed must also be locked. Accordingly, the lock area is larger than that when the resources are individually locked. This also decreases the parallel processing ability of the tasks. Further, since a user (developer of a program) must expressedly specify the resources to be locked, errors may be easily included during the development of the program and the reliability and the productivity of the program may be decreased.

On the other hand, in the back-out system, each task locks the resources which it needs, and if the deadlock occurs between the resources, the processing for all tasks is stopped and the deadlock is released. In this system, so long as the deadlock does not occur, the parallel processing ability of the tasks is higher than that of the bundle locking system. However, once the deadlock occurs, a long time is required before recovery from the deadlock status. In the recovery from the deadlock status in the back-out system, the processing of one of the tasks with which the deadlock occurs is invalidated so that the locked resource is forceably unlocked. However, this is not sufficient because the task invalidated has handled the resources before the deadlock occurs and such resources should be recovered to the state prior to the execution of the task. Further, since there is a possibility that the resource to be recovered has been unlocked and another task is executed by using that resource, such a task should also be invalidated (back-out chaining). Thus, in the back-out system, the amount of information processed for recovery is large and the recovery time is long. The invalidated task should be reexecuted and the response of the task is lowered in average. While a method to prevent the back-out chaining has been proposed, the deadlock still occurs and a considerable time is required to recover from the deadlock status in the back-out system.

It is thus seen that a system is necessary in which each task sequentially locks required resources and yet deadlock is prevented, such that processing time is shorter than that in the bundle lock system or the back-out system.

SUMMARY OF THE INVENTION

It is an object of the present invention to provide an exclusive control method to a data base which essentially improves a parallel processing ability of tasks by preventing the occurrence of deadlock.

It is another object of the present invention to provide an exclusive control apparatus for a data base which implement the above control method.

In order to achieve the above objects, the article "Avoiding Deadlock in Multi-tasking Systems" by J. W. Havender, IBM Systems Journal, Vol. 7, No. 2 (1968) was considered. It is described in the article that in a lock sequence for sequentially locking the resources by each task without unlocking the resources, if the sequence to lock two resources is common to all resources which are to be locked by two tasks, no deadlock will occur between those two tasks.

In the present invention, the following control is created: information on the lock sequence of the resources by the task which has not been previously managed in the computer system is inputted to the control apparatus before the task is executed; based on this input information, a combination of tasks which may possibly go into deadlock are extracted before the execution of the task; the extracted information is reference during the exeuction of the tasks; and the execution of the tasks is controlled so that the tasks which may go into the deadlock are not simultaneously executed (locking of the resource is permitted only to one task). Consequently, even if the task sequentially locks the resources required for the execution, no deadlock occurs between the tasks and the exclusive control of the data base if attained.

DESCRIPTION OF THE PREFERRED EMBODIMENTS

Figure 1:
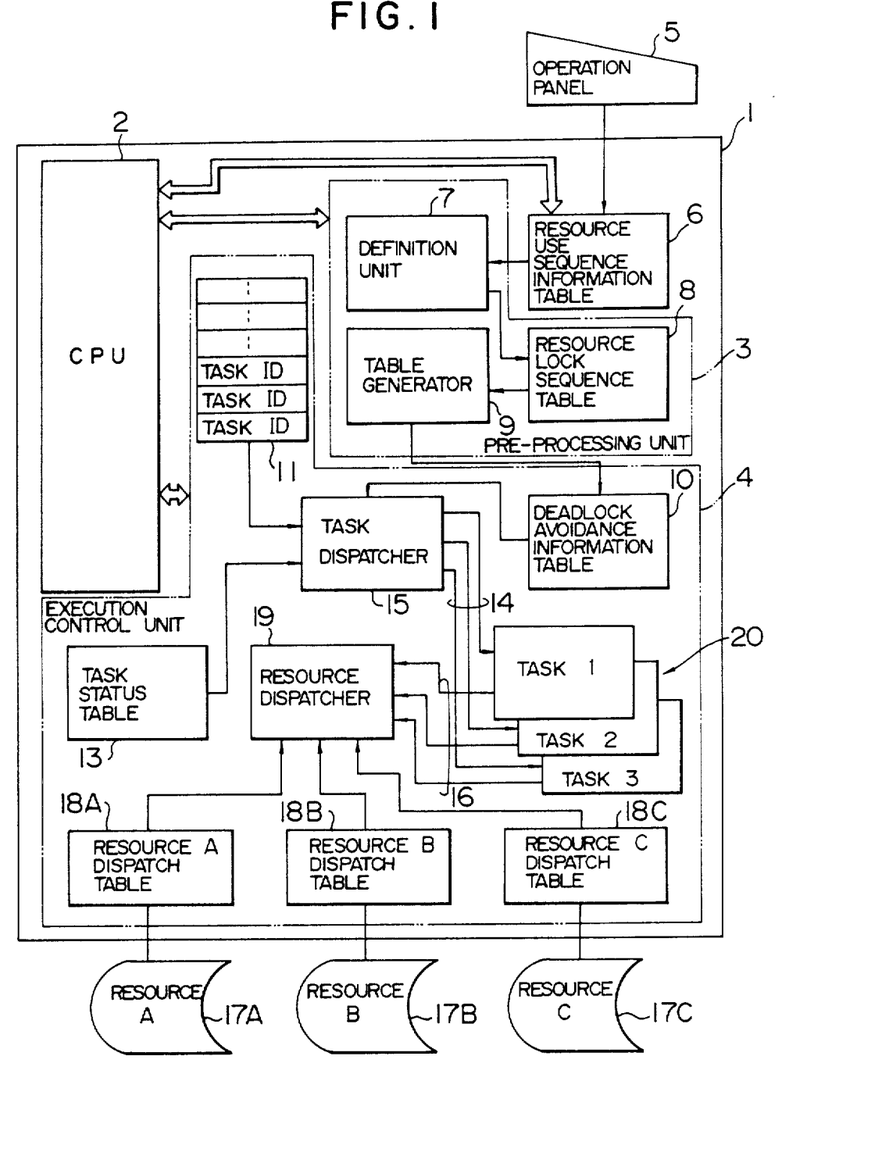
FIG. 1 shows a configuration of a computer system to which the present invention is applied.

FIG. 1 shows a configuration of a computer system to which the present invention is applied.

A computer system 1 comprises a CPU 2, a preprocessing unit 3 and an execution control unit 4. The CPU 2 stores, into a use sequence information memory 6, a resource use sequence information for each task provided by a user through an operation panel 5, before the execution of a task. A definition unit 7 prepares a resource lock sequence information based on the use sequence information and registers it in a resource lock sequence table, and a table generator 9 generates a deadlock avoidance information table 10 based on the registered information. The execution control unit 4 refers the deadlock avoidance information table 10 when the tasks are executed to control the execution of the tasks.

The execution control unit 4 comprises a tasks dispatcher 15 which reads a task identifier from a task queue 11 which has been holds the task identifier of a task which requested to begin, refers the deadlock avoidance information table 10 and the task status table 13 which manages the task execution status, and generates a start signal 14 to start the one of the tasks 1, 2 and 3 corresponding to the task identifier. The execution control unit 4 also includes a resource dispatcher 19 which refers resource dispatch tables 18A, 18B and 18C for resources A 17A, 17B and C 17C by a resource lock request signal which requests locking of the resources from the tasks 1, 2 and 3 to lock and unlock the resources.

The resource use sequence information for each task stored in the resource use sequence information memory 6 indicates a possibility of sequence when each task sequentially locks all resources without unlocking them. The sequence information is represented by a combination of a sequence rule to use the resources (for example, information which indicates a possibility of use of the resource B next to the resource A in a certain task) and a selection rule (for example, information indicating a possibility of use of one of the resources A and B in accordance with a processing result in a certain task) so that the sequence information can be represented by the selection rule even if the resource use sequence is not uniquely determined by the task execution sequence. The sequence rule merely indicates the possibility of the resource use sequence, and not all resources included in the use sequence information need be used in the execution of the task. (For example, the task which defines the sequence rule to use the resources A and B in this sequence in the resource use sequence information may use only the resource A or B in the actual execution of the task. However, if both the resources A and B are used, the resource A must be used first).

The definition unit 7 in the pre-processing unit 3 fetches the resource use sequence information stored in the memory 6 and develops it onto the resource lock sequence table 8 for each task.

Figure 2:
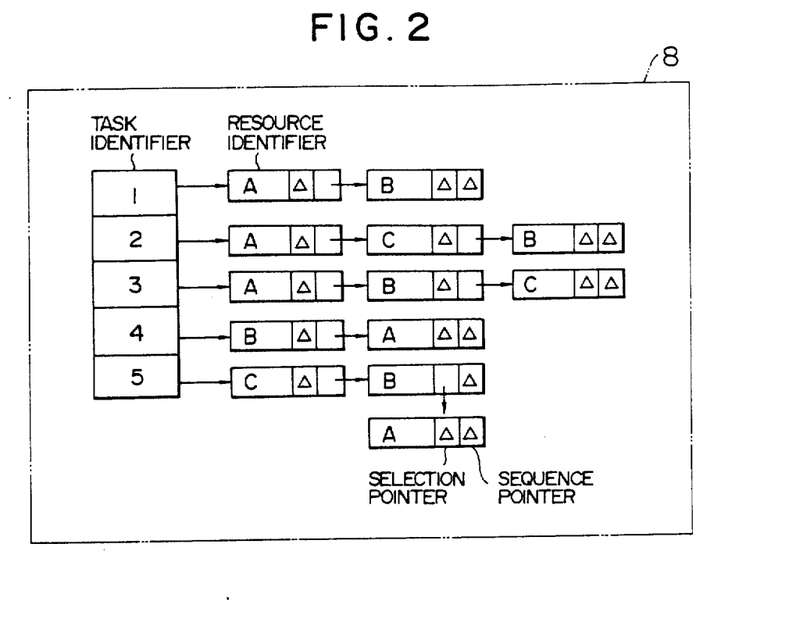
FIG. 2 shows a resource lock sequence table.

FIG. 2 shows the resource lock sequence table 8. It is a table which stores therein a resource use sequence defined for each task in accordance with a definition information. In the table, the sequence rule and the selection rule are represented by pointers. A symbol Δ in a pointer column indicates that the corresponding pointer is not used. For example, the task having the task identifier 5 may posssibly lock the resources C, A and B, and when the resource C is locked, it may possibly lock one of the resources A and B without unlocking the resource C. Based on the address of the task identifier 5, it is known that the resource to be first locked is the resource C, and based on the content of the sequence pointer stored in the sequence rule column corresponding to the resource C, it is known that the resource B is to be next locked in the task 5. Based on the content of the selection pointer stored in the selection rule column of the resource B, it is known that the resouce A has been taken out and the resource B or C is to be locked next to the resource C depending on the processing result of the task 5. Since there is no pointer in the selection rule column nor the sequence rule column of the resource A, it is known that no further resource locking is necessary.

On the other hand, the table generator 9 in the pre-processing unit 3 refers the resource lock sequence table 8 to search for tasks whose resource lock sequences are at least partially equal. The search is done in the following manner.

(1) For all sets of two resources included in the resource lock sequence for each task, it is checked whether the sequence rule is set up in each set, and all of the sets having sequence rules set up are extracted.

(2) For the extracted resource sets, it is checked whether the same set exists in the lock sequence for another task identifier, and if there is such set, the sequence thereof is checked, and if there is a set having a different sequence, the task identifier for that set is registered as a task identifier to indicate a possibility of deadlock for the task identifier under search in the deadlock avoidance information table 10.

(3) The above operation is carried out for all task identifier sets.

Figure 3:
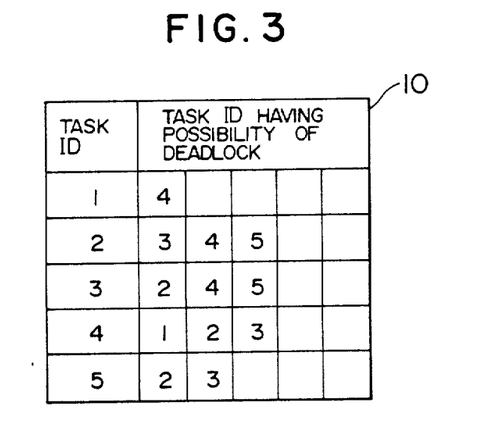
FIG. 3 shows a deadlock avoidance information table.

FIG. 3 shows the deadlock avoidance table 10. It contains the information generated in the manner described above.

The information generated above includes the task identifiers of the task which may possibly go into the deadlock. In the present invention, since the resource use sequence for each task has been inputted (defined) by the user before the execution of the task, the generation of the deadlock avoidance information table 10 can also be carried out before the execution of the task (at off-line). In the embodiment of FIG. 1, the user writes the resource use sequence information into the memory 6 through the operation panel 5. Alternatively, the CPU 2 may analyze the tasks in accordance with a program to determine the resource use sequences of the tasks and write them into the memory 6.

The operation of the table generator 9 is now explained. In FIG. 2, the resource lock sequence of the task having the task identifier 1 is from the resource A to the resource B. This set of resources A and B is included in all of four other tasks. Of those, the sequence rule is set up in the tasks having the task identifiers 2, 3 and 4. The sequences of the resources A and B for the task identifiers 2 and 3 are equal to that for the task identifier 1 but the sequence for the task identifier 4 is opposite. Accordingly, if the task of the task identifier 4 is executed simultaneously with the task of the task identifier 1 (or 2 or 3), the deadlock may occur. Accordingly, for the task identifier 1 in the deadlock avoidance information table 10, "4" is registered to indicate that the task having the task identifier 4 may go into the deadlock.

Figure 4:
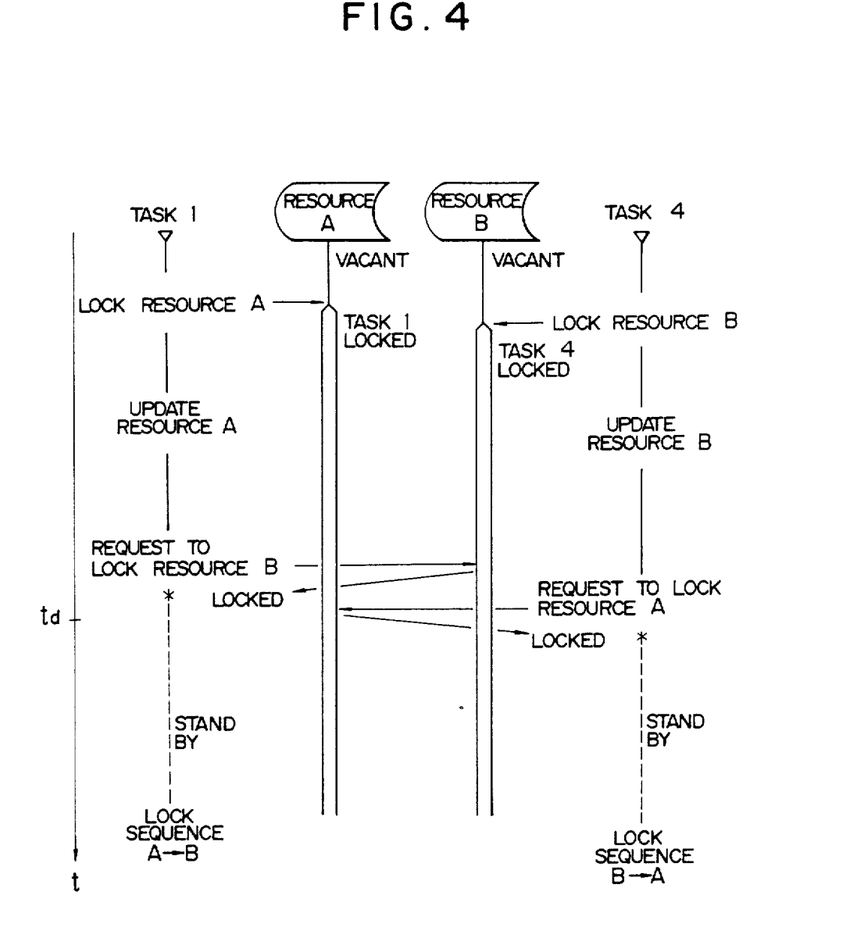
FIG. 4 illustrates a case where deadlock occurs.

In FIG. 4, the tasks having the task identifiers 1 and 4 are parallelly executed and each task is permitted to freely lock the resources. Without conducting the execution control of the present embodiment, as the tasks begin at the illustrated timing, both tasks go into a sand by made and deadlock occurs at time td.

Figure 5:
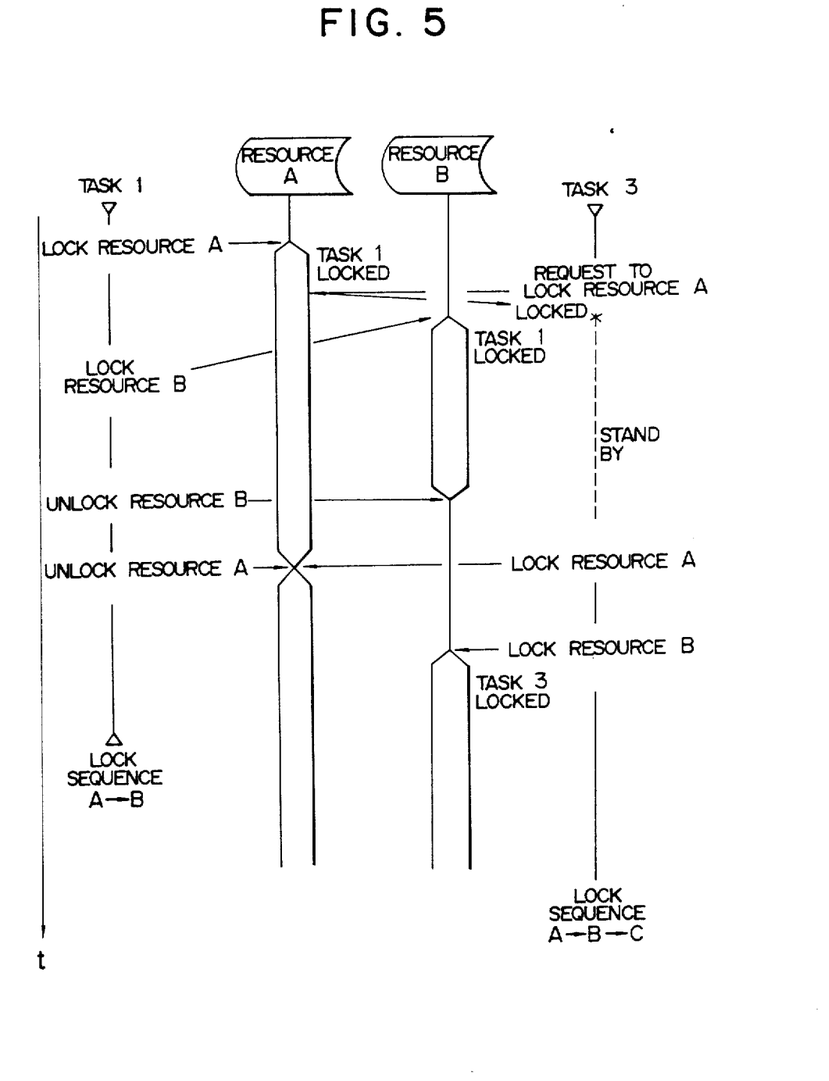
FIG. 5 illustrates a case where no deadlock occurs.

One the other hand, in FIG. 5, tasks having the same lock sequence (tasks having the task identifiers 1 and 3 is FIG. 2) are parallelly executed. In this case, the deadlock does not occur while the tasks are executed.

Thus, by previously defining the resource use sequence for each task, it is possible to determine the task sets which may possibly go into deadlock with other tasks, before the execution of the task. The result is supplied to the deadlock avoidance information table 10. Before the start of each task, the deadlock avoidance information table 10 is referred, and if the task which may possibly go into deadlock with the task which is presently to be started is being executed, the start of the new task is suspended and the deadlock does not occur. Thus, an overhead to avoid the deadlock in the execution of the task can be minimized. The resource lock sequence table 8 shown in FIG. 2 is selected such that the deadlock frequently occurs. In the actual parallel execution of the tasks, it is seldom that the task ID's which have possibility of frequent occurrence of deadlock as shown in FIG. 3 are registered.

One embodiment of the exclusive control method for the task execution is explained. One embodiment of the task execution control procedure in the execution control unit 4 of FIG. 1 is explained in detail.

Figure 6:
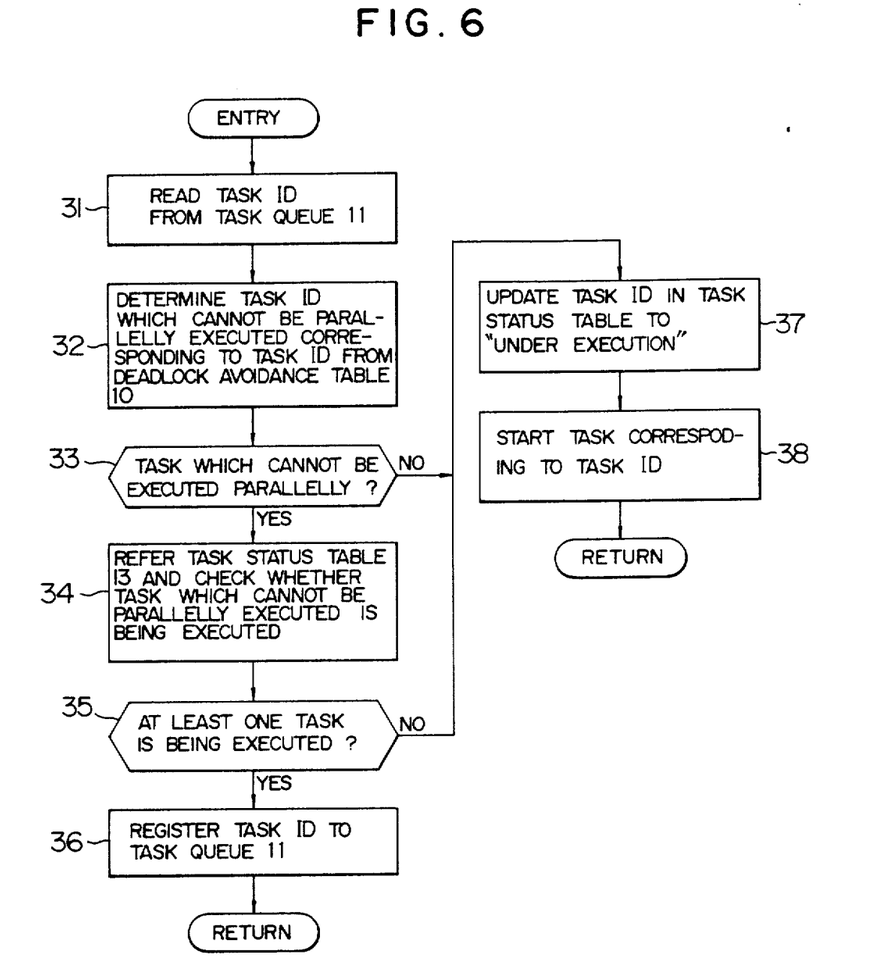
FIG. 6 shows a processing flow chart for a task dispatcher, and FIG. 7A and 7B respectively show a prior art system and the present system.

FIG. 6 shows a process flow for a task start request in the task dispatcher 19. When a start request is to be issued to the task 20, the task identifier is registered in the task queue 11. The task dispatcher 15 reads out the task identifier from the task queue 11 (step 31), refers the deadlock avoidance table 10 and reads out the task identifiers which may possibly go into deadlock (identifiers of the task which cannot be parallelly executed) (step 32). In step 33, if at least one task which cannot be parallelly executed is included, the task status table 13 checks to see whether the task identified by the task identifier of the task which cannot be parallelly executed is being executed or not (step 34). The task status table 13 holds information to indicate whether each task is being executed or not. If at least one task which cannot be parallelly executed is being executed (there is a possibility of deadlock if the requested task is started based on the result in the step 35, the task dispatcher 15 registers the identifier of the requested task to the task queue 11 (step 36). In the present embodiment, the task identifier is registered at the end of the task queue 11. Thus, the start of the task which may possibly go into deadlock is delayed until the task dispatcher 15 is next informed.

On the other hand, if it is determined that there is not task which cannot be parallelly executed in the step 33, or if no task which cannot be parallelly executed is being executed in the check of the step 35, the operation information to the requested task in the task status table is updated to "under execution", and the start of the task corresponding to the task identifier is requested to the OS to start the task. The task dispatcher 15 carries out the above operation to all tasks (task identifiers) registered in the task queue 11.

At the end of the execution of the sequence of tasks (including the end by error), the task 20 delivers the task identifier to the task dispatcher 15 and informs the end. The task dispatcher 15 updates the operation information of the end task in the task status table 13 to "stop". Further, the same operation as that of the start request (see FIG. 6) is carried out because the tasks which wait for the start upon the end of the task may be executed.

As described above, the task dispatcher 15 controls the axis so that the tasks which may possibly go into deadlock are not parallelly executed. Accordingly, deadlock between the tasks can be avoided even it the task sequentially locks the resources.

On the other hand, the task being executed delivers the task identifier and the resource identifier of the resource to be used to the resource dispatcher 19 at the beginning of the use of the resource (for example, at the time of execution of the OPEN processing of a file) to request locking of the resource.

The resource dispatcher 19 refers the corresponding one of the resource dispatch tables 18A, 18B and 18C to check whether the resource corresponding to the resource identifier is locked by another task or not. The resource dispatch tables 18A, 18B and 18C contain information as to whether the respective resources are locked or not and the identifiers of the locked tasks (only when they are locked). When a task other than the task which requested locking is locked, the resource dispatcher 19 holds the task which requested the locking in the stand-by state until the resource is unlocked. If the resource is not locked or the task which requested the locking has been locked, the lock information of the corresponding resource in the resource lock information table is updated to "locked" and the locking of the task which requested the locking is permitted.

On the other hand, at the end of use of the resource (for example, at the execution of CLOSE processing of the file), the task delivers the task identifier and the identifier of the resource whose use is to be ended to the resource dispatcher 19 to request unlocking of the resource. The resource dispatcher 19 changes the lock status information of the corresponding resources in the resource lock table of the unlock status and changes the task (which has been standing) from the stand-by status to the execution status. In this manner, the parallel operation to one resource by the plurality of tasks is avoided and the destruction of data integrity in the data base is prevented.

As described above, the execution control unit 4 is provided with the deadlock avoidance table 10, task status table and task dispatcher 15 and delays the start of the task which may possibly go into the deadlock so that the deadlock in the locking system is avoided.

Because the deadlock is avoided, only the resources to be used need to be locked or unlocked at the time of request to begin or end the use of resources (and there is no need to specify the resources to be used prior to the beginning of use as is required in the bundle locking system.) Therefore, when the user develops the program, he/she need not consider the locking and unlocking of the resources.

Figure 7A:
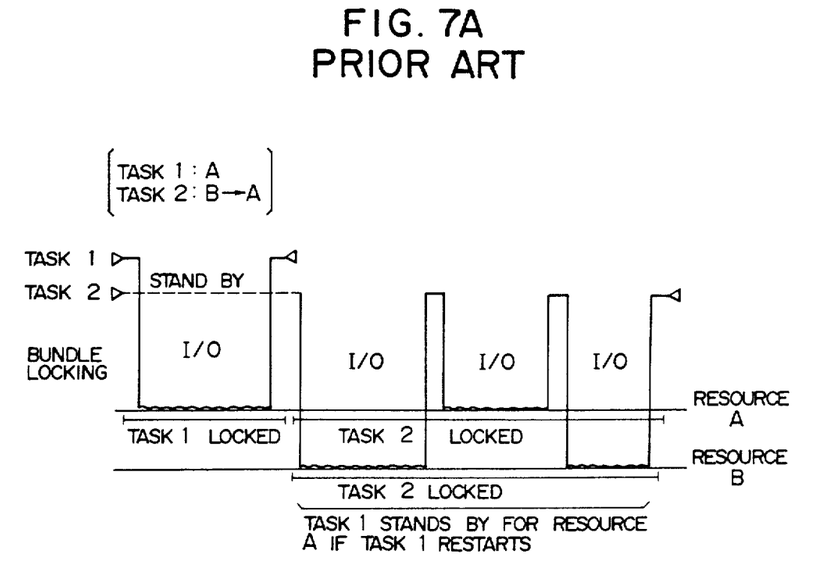
Figure 7B:
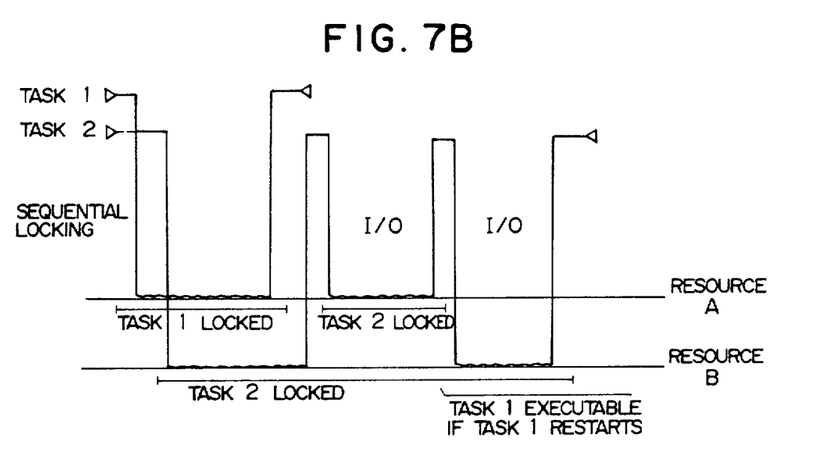

FIGS. 7A and 7B show a comparison of the resource lock periods by the tasks in the prior art bundle locking system (FIG. 7A) and the present system (FIG. 7B). According to the present invention, the resource lock period by the task is shorter, the possibility of requiring the task to wait for the unlocking of the resource is lower and the parallel processing ability is improved.

To compare with the back-out system, since the present system does not require the recovery time from the deadlock since the deadlock does not occur, the response of the task is not significantly deteriorated. In the present embodiment, the task uses the resources in the defined use sequence. If there is a possibility that the resources are used in other than the defined use sequence, the resource dispatcher 19 may refer the resource lock sequence table to check the use sequence when the resource is checked in order to prevent the task from using the resources in a wrong sequence.

While the exclusive lock system which locks the resource exclusively among the tasks has been described, the tasks may be limited to the retrival tasks and a shared locking system in which the resources may be simultaneously locked may be used. In this case, a lock mode (exclusive/shared) is defined in the resource lock sequence and the task which may possibly go into the deadlock is determined on the additional condition that the stand-by does not occur if both are in the shared lock mode. Thus, exclusive control with high parallel processing ability is attained.

As described hereinabove, according to the method and apparatus for exclusively controlling the data base, the exclusive control is attained without deadlock. Since a minimum number of resources necessary for the execution of the task are locked, the reduction of the task response and the reduction of the parallel processing ability are minimized. Since the exclusive control is automatically effected, the user is not required to lock or unlock the resources and the productivity and the reliability of programming are improved.

We claim:

1. A method for preventing deadlock in a data base management system of a computer in which a plurality of tasks share a plurality of resources contained in the data base and are parallelly executed, comprising the steps of:
 (a) inputting to the computer a resource use sequence of resources to be used by each task prior to the execution of the tasks;
 (b) performing a preprocessing in the computer in response to a request for a task including:
  (i) determining possibilities of deadlock between predetermined tasks due to sharing of common resources, between the predetermined tasks based on information from the inputted resource use sequence, prior to the start of execution of the tasks;
  (ii) preparing a first table which contains the deadlock possibilities;
  (iii) determining whether a task for which a start request is issued will go into deadlock if execution of the task is started based on the deadlock possibilities information contained in said first table;
  (iv) delaying the start of execution of the task for which the start request has been issued when it is determined that the task for which the start request has been issued may go into deadlock; and
 (c) starting in the computer the task which issued the start request when it is determined that the task which issued the start request will not go into deadlock.

2. A method for preventing deadlock in a data base management system according to claim 1, wherein said preprocessing step (b) further comprises:
 determining a lock status of a particular resource in response to a resource use request from a task which has been started;
 placing the requesting task in a stand-by state when it is determined that the particular resource requested by the task which has been started is in a locked state which indicates that the particular resource is being used by a different task; and
 placing the particular resource in the locked state when it is determined that the particular resource is not already in a locked state.

3. A method for preventing deadlock in a data base management system according to claim 1, wherein said step of determining possibilities of deadlock includes the step of determining whether a reverse use sequence for any two resources in a particular task exists in another task.

4. A method for preventing deadlock in a data base management system according to claim 1, wherein the information from the inputted resource use sequence includes a plurality of sets of information each including information on a resource to be presently used, information on a resource to be used subsequently, and information on a resource to be selected in accordance with a processing status of a particular task.

5. A method for preventing deadlock in a data base management system according to claim 1, wherein said resource use sequence is input by a computer operator.

6. An apparatus for preventing deadlock in a data base management system in which a plurality of tasks share a plurality of resources in the data base and the tasks are parallelly executed, comprising:
 first memory means for storing a plurality of resources;
 second memory means for storing information on a resource use sequence for the resources to be used by each task prior to execution of the tasks;
 a pre-processing unit connected to said second memory means for preparing information on possibilities of deadlock between predetermined tasks due to sharing of common resources among the tasks, based on the information of the resource use sequence stored in said second storage means, prior to a time when execution of the tasks is started; and
 an execution control unit connected to said first memory means and said pre-processing unit for determining at the time of receipt of a start request issued for a predetermined task, whether the start-requested predetermined task will go into deadlock with a task being executed based on the information identifying the task being executed, and for delaying the start of the start-requested predetermined task until the execution of the task being executed is completed, when it is determined that the start-requested predetermined task has a possibility of going into deadlock with the task being executed, thereby eliminating the possibility of deadlock.

7. An apparatus for preventing deadlock in a data base management system according to claim 6, wherein said pre-processing unit includes a lock sequence determination means connected to said second memory means for determining a lock sequence of the resources for each task based on the information in the resource use sequence stored in said second memory means, a resource lock sequence table connected to said lock sequence determination means for storing information on the resource lock sequence for each task, and a table generator connected to said resource lock sequence table for preparing the information on the possibilities of deadlock between predetermined tasks due to sharing of common resources among the tasks, based on the information stored in said resource lock sequence table, prior to the start of execution of the tasks.

8. An apparatus for preventing deadlock in a data base management system according to claim 6, wherein said execution control unit includes a deadlock avoidance information table connected to said table generator of said pre-processing unit for storing the information on the possibilities of deadlock between predetermined tasks due to the sharing of common resources among the tasks, prepared by said table generator, third memory means for storing a plurality of task programs, and a task dispatcher connected to said deadlock avoidance information table and said third memory means for determining whether the requesting predetermined task may go into deadlock based on the information stored in the deadlock avoidance information table, for delaying the start of the start requested predetermined task when it is determined that the start-requested predetermined task has a possibility of going into deadlock and for starting the start-requested predetermined task when it is determined that the start-requested predetermined task does not have a possibility of going into deadlock.

9. An apparatus for preventing deadlock in a data base management system according to claim 6, further comprising:
 resource dispatch table means connected to said resources for storing information on lock status of each resource; and
 a resourece dispatcher connectd to said resource dispatch table means and responsive to a resource lock request from the start-requested predetermined task and for placing the start-requested predetermined task in a stand-by state when it is determined that the start-requested predetermined task is being locked because a desired resource is being used by another task.

10. An apparatus for preventing deadlock in a data base management system according to claim 8, wherein said execution control unit includes task queue means connected to said task dispatcher for storing task identifiers for each task to be started and for issuing start requests for each task corresponding to the stored task identifiers to said task dispatcher in the order of the stored task identifiers.

11. An apparatus for preventing deadlock in a data base management system according to claim 10, wherein said task dispatcher stores the task identifier corresponding to the start-requested predetermined task which issued the start request in the task queue means, when the start of the start-requested predetermined task is to be delayed.

12. An apparatus for preventing deadlock in a data base management system according to claim 6, wherein said pre-processing unit determines the possibilities of deadlock by determining whether a reverse use sequence for that of any two resources in each task exists in another task.

13. An apparatus for preventing deadlock in a data base management system according to claim 7, wherein said resource lock sequence table includes a plurality of sets of information, each containing a memory location for storing information on a resource to be presently used, a sequence pointer for indicating a memory location which stores information on a resource to be used subsequently, and a selection pointer for indicating a memory location which stores a resource to be selected in accordance with the processing status of the start-requested predetermined task.

14. An apparatus for preventing deadlock in a data base management system according to claim 6, further comprising input means connected to said second memory means for allowing a user to enter the information on the resource use sequence of the resources to be used for each task.

* * * * *